(12) United States Patent
Choi et al.

(10) Patent No.: US 12,154,030 B2
(45) Date of Patent: Nov. 26, 2024

(54) METHOD AND APPARATUS FOR DATA-FREE POST-TRAINING NETWORK QUANTIZATION AND GENERATING SYNTHETIC DATA BASED ON A PRE-TRAINED MACHINE LEARNING MODEL

(71) Applicant: Samsung Electronics Co., Ltd., Suwon-si (KR)

(72) Inventors: Yoo Jin Choi, San Diego, CA (US); Mostafa El-Khamy, San Diego, CA (US); Jungwon Lee, San Diego, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 910 days.

(21) Appl. No.: 17/096,734

(22) Filed: Nov. 12, 2020

(65) Prior Publication Data

US 2022/0083855 A1    Mar. 17, 2022

Related U.S. Application Data

(60) Provisional application No. 63/078,791, filed on Sep. 15, 2020.

(51) Int. Cl.
*G06N 3/08* (2023.01)
*G06F 17/18* (2006.01)
(Continued)

(52) U.S. Cl.
CPC ............... *G06N 3/08* (2013.01); *G06F 17/18* (2013.01); *G06F 18/2113* (2023.01);
(Continued)

(58) Field of Classification Search
CPC ............ G06N 3/08; G06N 3/045; G06N 7/01; G06N 3/048; G06N 3/088; G06N 3/082;
(Continued)

(56) References Cited

U.S. PATENT DOCUMENTS 10,339,470 B1   7/2019 Dutta et al.
10,740,694 B2   8/2020 Harvill et al.
(Continued)

FOREIGN PATENT DOCUMENTS

CN    111008695 A  *  4/2020  ............. G06F 17/15
WO    WO-2009046185 A2 * 4/2009  ......... G01N 15/1459

OTHER PUBLICATIONS

Yin Dreaming to Distill Data free Knowledge Transfer via DeepInversion, arXiv, 2019, (Year: 2019).*

(Continued)

*Primary Examiner* — Andrew R Dyer
*Assistant Examiner* — Shien Ming Chou
(74) *Attorney, Agent, or Firm* — Lewis Roca Rothgerber Christie LLP

(57) ABSTRACT

A method for training a generator, by a generator training system including a processor and memory, includes: extracting training statistical characteristics from a batch normalization layer of a pre-trained model, the training statistical characteristics including a training mean $\mu$ and a training variance $\sigma^2$; initializing a generator configured with generator parameters; generating a batch of synthetic data using the generator; supplying the batch of synthetic data to the pre-trained model; measuring statistical characteristics of activations at the batch normalization layer and at the output of the pre-trained model in response to the batch of synthetic data, the statistical characteristics including a measured mean $\hat{\mu}_\psi$ and a measured variance $\hat{\sigma}_\psi^2$; computing a training loss in accordance with a loss function $L_\psi$ based on $\mu$, $\sigma^2$,
(Continued)

$\hat{\mu}_\psi$, and $\hat{\sigma}_\psi^2$; and iteratively updating the generator parameters in accordance with the training loss until a training completion condition is met to compute the generator.

14 Claims, 7 Drawing Sheets

(51) Int. Cl.
   *G06F 18/2113* (2023.01)
   *G06F 18/214* (2023.01)
   *G06F 18/22* (2023.01)
   *G06N 3/045* (2023.01)
   *G06N 7/01* (2023.01)

(52) U.S. Cl.
   CPC ............ *G06F 18/214* (2023.01); *G06F 18/22* (2023.01); *G06N 3/045* (2023.01); *G06N 7/01* (2023.01)

(58) Field of Classification Search
   CPC .......... G06N 3/084; G06N 3/044; G06N 3/04; G06N 20/00; G06F 17/18; G06F 18/2113; G06F 18/214; G06F 18/22; G06V 10/761; G06V 10/772; G06V 10/774; G06V 10/82; G06T 11/00; G06T 5/50; G06T 2207/20081; G06T 2207/20084; G06T 2207/20221
   See application file for complete search history.

(56) References Cited

U.S. PATENT DOCUMENTS

| | | |
|---|---|---|
| 2018/0158210 A1 | 6/2018 | Estrada et al. |
| 2019/0080347 A1 | 3/2019 | Smith |
| 2020/0125956 A1 | 4/2020 | Ravi et al. |

OTHER PUBLICATIONS

Micaelli zero shot knowledge transfer via adversarial belief matching, arXiv, 2019 (Year: 2019).*

Han Deep Compression Compressing Deep Neural Networks with Pruning Trained Quantization and Huffman Coding, arXiv, 2016 (Year: 2016).*

Goodfellow, Ian, et al. "Generative adversarial nets." *Advances in neural information processing systems*. 2014, 9 sheets.

Ioffe, Sergey, and Christian Szegedy. "Batch normalization: Accelerating deep network training by reducing internal covariate shift." arXiv preprint arXiv:1502.03167 (2015), 11 pages.

Kingma, Diederik P., and Max Welling. "Auto-encoding variational bayes." arXiv preprint arXiv:1312.6114 (2013), 14 sheets.

Choi, Yoojin, et al., "Data-Free Network Quantization With Adversarial Knowledge Distillation," arXiv preprint arXiv:2005.04136v1, May 2020, 11 pages.

German Office Action, with English translation, dated Nov. 25, 2021, issued in corresponding DE Patent Application No. 10 2021 116 436.2 (18 pages).

* cited by examiner

METHOD AND APPARATUS FOR DATA-FREE POST-TRAINING NETWORK QUANTIZATION AND GENERATING SYNTHETIC DATA BASED ON A PRE-TRAINED MACHINE LEARNING MODEL

CROSS-REFERENCE TO RELATED APPLICATION(S)

This application claims priority to and the benefit of U.S. Provisional Patent Application No. 63/078,791, filed in the United States Patent and Trademark Office on Sep. 15, 2020, the entire disclosure of which is incorporated by reference herein.

FIELD

Aspects of embodiments of the present disclosure relate to machine learning, including systems and methods for data-free post-training machine learning model quantization, such as quantization of deep neural networks, and including systems and methods for generating synthetic data based on a pre-trained machine learning model.

BACKGROUND

Machine learning or statistical learning computational techniques generally use statistically-trained models to perform predictions or inferences based on some input data. In the case of supervised learning, these statistical models are configured with parameters that are computed based on labeled training data. For example, a training process may update the parameters of the statistical model to reduce or minimize differences between the predictions made by the statistical model in accordance with the parameters and the labeled training data that represents the ground truth.

SUMMARY

Some aspects of embodiments of the present disclosure relate to methods and apparatuses for data-free post-training quantization of a pre-trained statistical model such as a deep neural network. Some aspects of embodiments of the present disclosure relate to synthesizing or generating data that is statistically similar to the original training data that was used to train the particular statistical model, such as a neural network, using the particular statistical model as input and without using the original training data (e.g., the data-free generation of synthetic data).

According to one embodiment, a method for training a generator for synthesizing data includes: extracting, by a generator training system including a processor and memory, a plurality of training statistical characteristics from a batch normalization layer of a pre-trained model, the training statistical characteristics including a training mean $\mu$ and a training variance $\sigma^2$; initializing, by the generator training system, a generator configured with a plurality of generator parameters; generating, by the generator training system, a batch of synthetic data using the generator; supplying, by the generator training system, the batch of synthetic data to the pre-trained model; measuring, by the generator training system, a plurality of measured statistical characteristics of activations at the batch normalization layer of the pre-trained model and the output of the pre-trained model in response to the batch of synthetic data, the measured statistical characteristics including a measured mean $\hat{\mu}_\psi$ and a measured variance $\hat{\sigma}_\psi^2$; computing, by the generator training system, a training loss in accordance with a loss function $L_\psi$ based on the training mean $\mu$, the training variance $\sigma^2$, the measured mean $\hat{\mu}_\psi$, and the measured variance $\hat{\sigma}_\psi^2$; and iteratively updating the generator parameters in accordance with the training loss until a training completion condition is met to compute the generator.

The loss function $L_\psi$ may include a term that computes a distance between the training mean $\mu$ and the measured mean $\hat{\mu}_\psi$, and between the training variance $\sigma^2$ and the measured variance $\hat{\sigma}_\psi^2$.

The distance may be computed based on a Kullback-Leibler (KL) divergence $\mathcal{D}_N$.

The pre-trained model may be a convolutional neural network and the loss function $L_\psi$ includes a term for the KL divergence:

$$\sum_{l,c} \mathcal{D}_N((\hat{\mu}_\psi(l, c), \hat{\sigma}_\psi^2(l, c)), (\mu(l, c), \sigma^2(l, c)))$$

where l corresponds to a batch normalization index, c corresponds to a channel index of the input to an l-th batch normalization layer, and $$\mathcal{D}_N((\hat{\mu}, \hat{\sigma}^2), (\mu, \sigma^2)) = \frac{(\hat{\mu} - \mu)^2 + \hat{\sigma}^2}{2\sigma^2} - \log\frac{\hat{\sigma}}{\sigma} - \frac{1}{2}.$$

The generator may be a non-conditional generator and the loss function $L_\psi$ may further include: a term for reducing an instance categorical entropy of an output of the pre-trained model in response to the batch of synthetic data; and a term for increasing a batch categorical entropy of the output of the pre-trained model in response to the batch of synthetic data.

The term for reducing the instance categorical entropy may be expressed as:

$$\mathbb{E}_{p(z)}[H(t_{\theta^*}(g_\psi(z)))]$$

wherein the term for increasing the batch categorical entropy is expressed as:

$$H(\mathbb{E}_{p(z)}[t_{\theta^*}(g_\psi(z))])$$

where $g_\psi$ represents the generator being trained, z is a random input to the generator, H(p) is the entropy of probability distribution p, and $\mathbb{E}_{p(z)}$ represents an expected value over probability distribution p.

The generator may be a conditional generator and the loss function $L_\psi$ may further include a term for reducing a cross-entropy between a conditional label supplied to the conditional generator and an output of the pre-trained model in response to the batch of synthetic data.

The term for reducing the cross-entropy between the conditional label l supplied to the conditional generator $g_\psi$ and the output of the pre-trained model $t_{\theta^*}$ may be expressed as:

$$\mathbb{E}_{p(z,l)}[H(l, t_{\theta^*}(g_\psi(z,l)))]$$

where H(q,r) is the cross-entropy between two probability distributions q and r, and where $t_{\theta^*}(g_\psi(z,l))$ is the output of the pre-trained model $t_{\theta^*}$ in response to being supplied an input generated by the generator $g_\psi$ based on random input z and the conditional label l.

The method may further include performing model compression on the pre-trained model using the generator by: generating additional synthetic data based on the generator; supplying the additional synthetic data to the pre-trained model; collecting statistics of activations of the pre-trained model; and quantizing the pre-trained model based on the statistics of activations of the pre-trained model.

The method may further include performing model compression on a second pre-trained model, the pre-trained model and the second pre-trained model being trained using a same set of training data, by: generating additional synthetic data based on the generator; supplying the additional synthetic data to the second pre-trained model; collecting statistics of activations of the second pre-trained model; and quantizing the second pre-trained model based on the statistics of activations of the second pre-trained model.

According to one embodiment of the present disclosure, a system for training a generator for synthesizing data includes: a processor; and a memory storing instructions that, when executed by the processor, cause the processor to: extract a plurality of training statistical characteristics from a batch normalization layer of a pre-trained model, the training statistical characteristics including a training mean $\mu$ and a training variance $\sigma^2$; initialize a generator configured with a plurality of generator parameters; generate a batch of synthetic data using the generator; supply the batch of synthetic data to the pre-trained model; measure a plurality of measured statistical characteristics of activations at the batch normalization layer of the pre-trained model and the output of the pre-trained model in response to the batch of synthetic data, the measured statistical characteristics including a measured mean $\hat{\mu}_\psi$ and a measured variance $\hat{\sigma}_\psi^2$; compute a training loss in accordance with a loss function $L_\psi$ based on the training mean $\mu$, the training variance $\sigma^2$, the measured mean $\hat{\mu}_\psi$, and the measured variance $\hat{\sigma}_\psi^2$; and iteratively update the generator parameters in accordance with the training loss until a training completion condition is met to compute the generator.

The loss function $L_\psi$ may include a term that computes a distance between the training mean $\mu$ and the measured mean $\hat{\mu}_\psi$, and between the training variance $\sigma^2$ and the measured variance $\hat{\sigma}_\psi^2$.

The distance may be computed based on a Kullback-Leibler (KL) divergence $\mathcal{D}_\mathcal{N}$.

The pre-trained model may be a convolutional neural network and the loss function $L_\psi$ includes a term for the KL divergence:

$$\sum_{l,c} \mathcal{D}_\mathcal{N}((\hat{\mu}_\psi(l,c), \hat{\sigma}_\psi^2(l,c)), (\mu(l,c), \sigma^2(l,c)))$$

where l corresponds to a batch normalization index, c corresponds to a channel index of the input to an l-th batch normalization layer, and $$\mathcal{D}_\mathcal{N}((\hat{\mu}, \hat{\sigma}^2), (\mu, \sigma^2)) = \frac{(\hat{\mu}-\mu)^2 + \hat{\sigma}^2}{2\sigma^2} - \log\frac{\hat{\sigma}}{\sigma} - \frac{1}{2}.$$

The generator may be a non-conditional generator and the loss function $L_\psi$ may further include: a term for reducing an instance categorical entropy of an output of the pre-trained model in response to the batch of synthetic data; and a term for increasing a batch categorical entropy of the output of the pre-trained model in response to the batch of synthetic data.

The term for reducing the instance categorical entropy may be expressed as:

$$\mathbb{E}_{p(z)}[H(t_{\theta^*}(g_\psi(z)))]$$

wherein the term for increasing the batch categorical entropy is expressed as:

$$H(\mathbb{E}_{p(z)}[t_{\theta^*}(g_\psi(z))])$$

where $g_\psi$ represents the generator being trained, z is a random input to the generator, H(p) is the entropy of probability distribution p, and $\mathbb{E}_{p(z)}$ represents an expected value over probability distribution p.

The generator may be a conditional generator and the loss function $L_\psi$ may further include a term for reducing a cross-entropy between a conditional label supplied to the conditional generator $g_\psi$ and an output of the pre-trained model in response to the batch of synthetic data.

The term for reducing the cross-entropy between the conditional label l supplied to the conditional generator and the output of the pre-trained model $t_{\theta^*}$ may be expressed as:

$$\mathbb{E}_{p(z,l)}[H(l, t_{\theta^*}(g_\psi(z,l)))]$$

where H(q,r) is the cross-entropy between two probability distributions q and r, and where $t_{\theta^*}(g_\psi(z,l))$ is the output of the pre-trained model $t_{\theta^*}$, in response to being supplied an input generated by the generator $g_\psi$ based on random input z and the conditional label l.

The memory may further store instruction for performing model compression on the pre-trained model using the generator by: generating additional synthetic data based on the generator; supplying the additional synthetic data to the pre-trained model; collecting statistics of activations of the pre-trained model; and quantizing the pre-trained model based on the statistics of activations of the pre-trained model.

The memory may further store instructions for performing model compression on a second pre-trained model, the pre-trained model and the second pre-trained model being trained using a same set of training data, by: generating additional synthetic data based on the generator; supplying the additional synthetic data to the second pre-trained model; collecting statistics of activations of the second pre-trained model; and quantizing the second pre-trained model based on the statistics of activations of the second pre-trained model.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
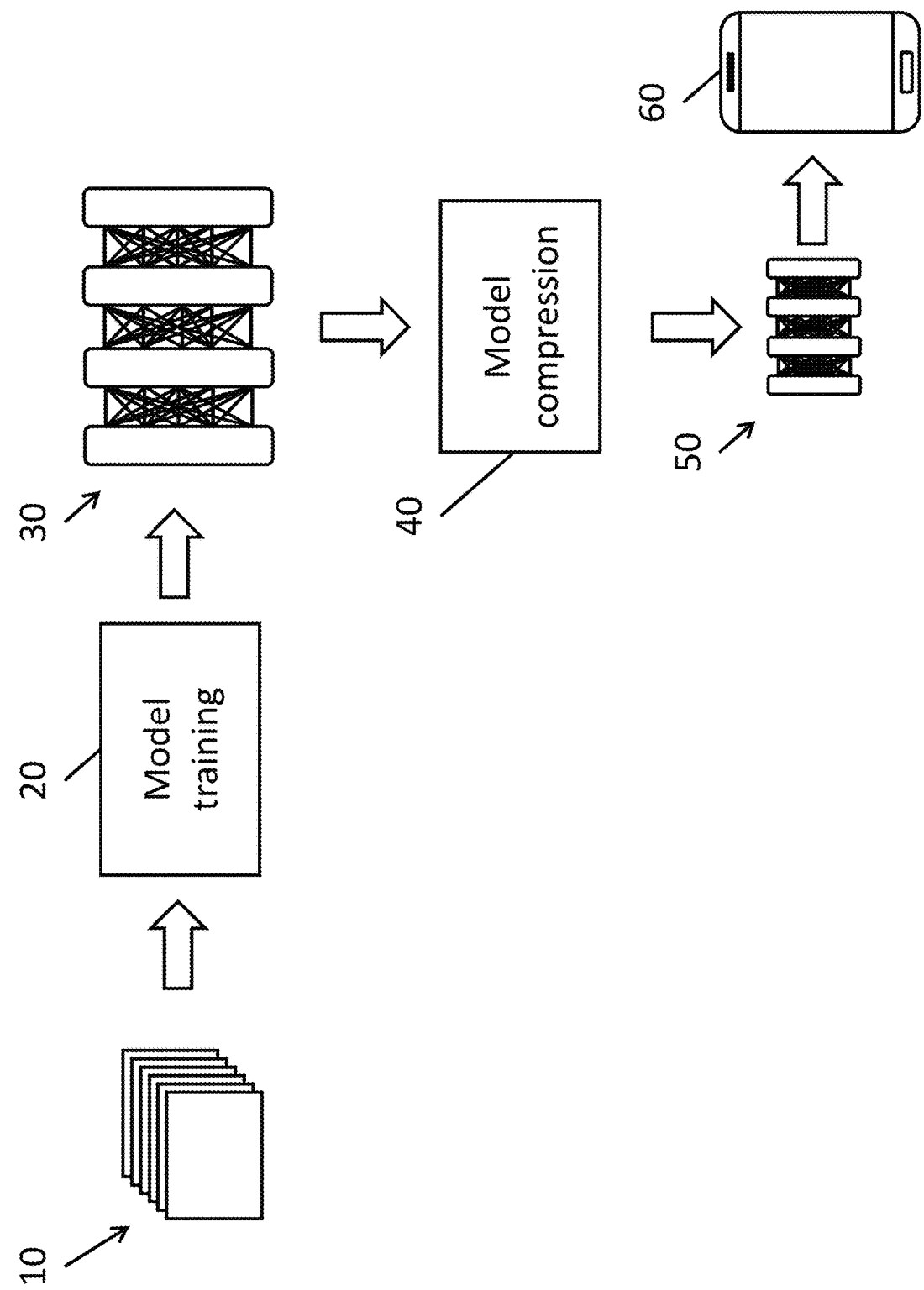
FIG. 1 is a schematic diagram of a process of training a statistical model and applying post-training compression to the pre-trained model for deployment according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Neural networks are one category of statistical models that are applied to a variety of machine learning tasks. As one example of a machine learning task, in the field of computer vision or machine vision, one prediction task relates to classifying input images based on the classes of objects depicted in those images. These images may be captured by a camera, and may be applied in circumstances such as self-driving vehicles, where cameras capture images of the environment surrounding the vehicle to detect the presence of people, animals, other vehicles, the drivable pavement and ramps, road markings, and the like. Other examples of uses of computer vision include the improvement of camera systems by that an image depicts people, dogs, cats, trees, cars, and the like, for later text-based searching. Some machine learning approaches to this computer vision task relate to training a convolutional neural network (CNN) to perform these classifications based on a collection of input images where the images are labeled with various classes of objects. While some aspects of embodiments of the present disclosure will be described herein in detail in the context of machine vision using CNNs, embodiments of the present disclosure are not limited thereto and may be applied to, such as audio signal processing (e.g., using recurrent neural networks), natural language processing, and the like.

Generally, an artificial neural network includes one or more "layers" of "neurons." Each neuron in a layer receives inputs or "activations" from a previous layer and combines the inputs in accordance with its particular set of parameters, such by multiplying its inputs by corresponding weights and summing the weighted inputs to generate an output. The output may then be supplied to an activation function such as a rectified linear unit (ReLU), and the output of a neuron (or its output "activation") is then be supplied as input to another layer of the network. An input layer to the network corresponds to information from outside (e.g., an image in the case of a computer vision task), and an output layer provides the result computed by the neural network. Layers between the input layer and the output layer are referred to as hidden layers. The form of the output of the network relates to the particular machine learning task. For example, in the case of a neural network trained to perform classification, the output may be a vector where each position in the vector corresponds to a different class of object, and the value at each position in the vector corresponds to the probability or confidence that the image depicts an object of the correspond class. As another example, in the case of a convolutional neural network trained to perform instance segmentation, the output may be a segmentation map (e.g., a two-dimensional map), where each position in the segmentation map indicates a confidence that the image depicts an object belonging to a particular class (e.g., identifying portions of the image that depict people versus dogs versus cars).

Deep neural networks are a particular category of neural networks that include more than one hidden layer. Deep learning refers to the training and use of deep neural networks. Deep learning is now leading many performance breakthroughs in various computer vision tasks. The state-of-the-art performance of deep learning came with over-parameterized deep neural networks, which enable automatic extraction of useful representations (features) of the data for a target task when the network is trained on a very large training data set. Deep neural networks are typically trained using stochastic gradient descent and backpropagation, where the parameters of the network (e.g., the weights of the inputs to the neurons) are updated to reduce or minimize differences between the ground truth output (the labeled, desired output) and the outputs trained by the network as configured with the current parameters.

While optimization frameworks for training deep neural networks with stochastic gradient descent and backpropagation have become very fast and efficient using hardware units specialized for matrix and tensor computations such as graphical processing units (GPUs), training a large statistical model is generally a computationally resource intensive process involving the use of large amounts of memory and computing time. Large statistical models may be over-parameterized, in that a large number of parameters is used in the model to improve the ability of the model to capture the statistical characteristics of the predictive task to be learned, and the behavior of the resulting trained statistical model may actually be characterized primarily on a subset of the parameters (e.g., the other parameters may be ignored with little effect on the accuracy of the network) and/or the parameters may be represented at a lower resolution than used during training (e.g., the number of bits in the representations of the parameters may be reduced with little effect on the accuracy of the network). Over-parameterization is an important factor in the success of deep learning, but once a well-trained high-accuracy model is obtained, its deployment on various inference platforms (e.g., use in the field) faces different requirements and challenges. In particular, when deploying large pre-trained models on resource-constrained computing platforms such as mobile or edge devices (e.g., end-user devices such as smartphones), the computational costs and memory requirements become important factors for efficient inference (e.g., using the trained model to make statistical predictions). Hence, model compression, also sometimes called network compression, is an important procedure for development of efficient inference models for deployment in the field.

Two approaches to model compression include reducing the number of parameters, which may be referred to as "weight pruning," and reducing the resolution of parameters, which may be referred to as "quantization." Weight pruning compresses a model by completely removing redundant weights, thereby allowing those connections between layers to be skipped (thereby reducing computational requirements because these multiplications do not need to be performed) as well as reducing the storage requirements of the network (because the pruned weights do not need to be stored). Quantization reduces the memory footprint for all of the weights and activations of a neural network through quantization of those values to n-bit fixed-point values (where n is typically less than or equal to 8) and is usually followed by lossless source coding for compression. Applying model compression techniques such as weight pruning and quantization to trained models can reduce the computational cost (e.g., in terms of memory usage and processor time) of using these pre-trained models, which may be especially beneficial in resource-constrained computing platforms.

Two approaches to neural network quantization include quantization-aware training and post-training quantization. In quantization-aware training, quantization nodes are added to a neural network to quantize values when they are passed from one layer to the next. (The quantization nodes are replaced with an identity function during backwards passes of the backpropagation algorithm.) These quantization nodes enable the training of a quantized neural network, where forward passes use quantized weights and activations. In post-training quantization, a pre-trained model that was trained with higher resolution parameters such as 32-bit floating point (FP32) parameters (e.g., FP32 weights and activations) may be converted into a quantized model (e.g., using, for example, 8-bit integers (INT8) or 16-bit floating point (FP16)) without fine tuning the weights.

FIG. 1 is a schematic diagram of a process of training a statistical model and applying post-training compression to the pre-trained model for deployment according to one embodiment of the present disclosure. In the embodiment shown in FIG. 1, training data 10 (e.g., labeled images or photographs) are supplied to a model training system 20, which takes a given model architecture (e.g., a given neural network architecture) and trains a model (e.g., a deep neural network) to make predictions that are consistent with the labeled training data 10. This trained model may be referred to herein as a pre-trained model 30, as aspects of embodiments of the present disclosure relate to the use of the model after it has been trained. In some circumstances, the model training system 20 takes an untrained model as input (e.g., a model architecture with parameters initialized to random values, such as a deep neural network architecture with weights initialized to random weight values) or takes a pre-trained network as input (e.g., a neural network trained on the ImageNet data set, see, e.g., J. Deng, W. Dong, R. Socher, L.-J. Li, K. Li and L. Fei-Fei, ImageNet: A Large-Scale Hierarchical Image Database. *IEEE Computer Vision and Pattern Recognition (CVPR)*, 2009). Generally, during the training process, the parameters of the model are represented with high-precision or high-resolution (e.g., a large number of bits, such as 32 bits or 64 bits). Because the model training system is typically computationally resource intensive, the model training system 20 may be executed on one or more resource-rich computer systems, such as one or more a server computers with a large amount of memory, one or more processors (or central processing units or CPUs), and one or more co-processors such as graphical processing units (GPUs), a dedicated application specific integrated circuit (ASIC) configured to accelerate computations related to deep learning (e.g., specialized for computing activation functions and dot products), and/or other vector processors.

The pre-trained model 30 may be used for performing inference (e.g., computing predictions) based on given input. However, as noted above, the size of the pre-trained model 30 (e.g., in the number of weights and the storage requirements of running a neural network in forward-propagation or inference mode) may make it impractical or infeasible to deploy the model onto a resource-constrained computing device such as an edge computing device or a smartphone. Accordingly, applying a model compression system 40 to a pre-trained model 30 can result in a compressed model 50 that is smaller than the pre-trained model 30. The model compression system 40 may include performing connection pruning and/or network quantization on the pre-trained model 30 to generate the compressed model 50 such that the compressed model 50 can be executed in a resource-constrained computing device, such as an edge computing device or a smartphone 60. The model compression system 40 may similarly be performed using a resource rich computing system such as that described above with respect to the model training system 20. While the model compression system 40 may be performed on the same hardware as the model training system 20, embodiments of the present disclosure are not limited thereto, and different hardware (e.g., operated by different entities) may be used to perform the model training system 20 versus the model compression system 40.

Regarding network quantization in more detail, as one example, when quantizing a pre-trained model 30 (e.g., a pre-trained neural network) that uses FP32 weights and FP32 activations to use INT8 for both, the FP32 weight values and FP32 activation values are mapped into a plurality of bins, where each bin corresponds to a range of FP32 values and is referenced by a corresponding INT8 value. When performing quantization of a particular value, the system determines which bin the particular value falls into and proceeds with representing the particular value using the INT8 corresponding to that bin.

Using, for example, the IEEE 754 standard, an FP32 value can represent values in a range of $-3.4028235 \times 10^{38}$ to $3.4028235 \times 10^{38}$. Because the actual weights and activations in a neural network likely fall into a much narrower subrange within the possible space of values represented using FP32, statistical information such as the minimum, maximum, and distribution of the actual FP32 weights and FP32 activations of a trained neural network is useful for calibrating quantization parameters such as setting the bin sizes (e.g., the range encompassed by each bin) and bias (e.g., the lowest possible value representable by the quantization parameters) in a manner that captures the actual range of the values in the neural network and that minimizes the quantization error (e.g., minimizes the difference between the actual value and the quantized value).

For example, in some neural networks, the activations of some layers may be uniformly distributed in a range of [0, 1). Accordingly, when quantizing the network to INT8, the bias may be set to a floor value of 0, and the range of values from zero to 1 is divided into $2^8=256$ bins, where each of the 256 bins corresponds to a different subrange (e.g., subrange 0 may be [0, 0.00390625), subrange 1 may be [0.00390625, 0.00781250), subrange 3 may be [0.00781250, 0.01171875), etc.). In some circumstances, different bins may correspond to ranges of different sizes (different bin sizes), e.g., where some subranges may include more bins to reduce quantization error in some value ranges, at the expense of increased quantization error in other value ranges. This may be beneficial in circumstances where the values of the weights or activations are not uniformly distributed over the range of values. While the range of [0, 1) is provided as an example here, the range and distribution of activations of a layer of a neural network are often not known ahead of time.

The weights of a pre-trained network are stored within the trained model and therefore statistical information such as the minimum, maximum, and distribution of the weights may be observed by examining the stored weight values directly. However, the activations of the neurons of the various layers of the trained neural network are only observable from running the network based on a calibration data set of a representative input, such as the training data used to train the network to assess the range (minimum and maximum) of the activation output values and to determine the scaling factor (or "scale") and bias (or "zero point") of quantization for the activations.

An example of a quantization process will be described in more detail below with respect to quantization to 8-bit fixed point (INT8) although embodiments of the present disclosure are not limited thereto and may be applied to quantization to any number of bits, e.g., less than 8 bits or more than 8 bits. In some approaches, 8-bit quantization approximates floating-point values (e.g., FP32 values) using the following equation:

$$\text{fp32\_value} = (\text{int8\_value} - \text{zero\_point}) \cdot \text{scale} \quad (1)$$

where "zero_point" is 32-bit integer (INT32) and "scale" is 32-bit floating-point (FP32) value [2,6] (the scaling may be implemented as integer multiplication and bit shift). The representation has two main parts: (1) per-axis (aka per-channel) or per-tensor weights represented by INT8 two's complement values in the range [−127, 127] with zero-point equal to 0; and (2) per-tensor (aka per-layer) activations/inputs represented by INT8 two's complement values in the range [−128, 127], with a zero-point in range [−128, 127].

Per-tensor quantization means that there will be one scale and/or zero-point per entire tensor. Per-axis quantization means that there will be one scale and/or zero_point per slice in the quantized dimension. The quantized dimension specifies the dimension of the shape of the tensor that the scales and zero-points correspond to.

Activations are generally asymmetric—they can have their zero-point anywhere within the signed INT8 range [−128, 127]. Many activation functions are asymmetric (e.g., ReLU has a minimum output value of zero and other rectifiers may have similar lower bounds on their outputs) and therefore a zero-point is one way to effectively gain up to one extra binary bit of precision.

On the other hand, weights are symmetric—they are forced to have zero-point equal to 0. Weight values are multiplied by dynamic input values and activation values. This means that there is an unavoidable runtime cost of multiplying the zero-point of the weight with the activation value. However, this cost can be avoided by enforcing that zero-point is 0.

The int8_value, scale, and zero-point of Equation (1), above, are determined based on the range of weights or activations to quantize. Letting [a, b] the quantization range, 8-bit quantization (Quant) of real value x (e.g., FP32 value) follows Equation (2):

$$\text{Quant}(x) = \left(\left(\text{round}\left(\frac{\text{clamp}(x, a, b) - a}{\Delta}\right) - 128\right) + \left(\frac{a}{\Delta} + 128\right)\right) \cdot \Delta \quad (2)$$

where $$\Delta = \frac{b - a}{255}$$

and $$\text{clamp}(x, a, b) = \min(\max(x, a), b)$$

The minimum and maximum of the values to be quantized (e.g., the weights or the activations) are taken as the endpoints a and b of the range. In both cases, the boundaries a and b are adjusted so that value 0.0 is exactly representable as an integer "zero-point." Letting [a', b'] be the adjusted range, the int8_value, scale, and zero-point can be respectively computed by Equations (3), (4), and (5):

$$\text{int8\_value} = \text{round}\left(\frac{\text{clamp}(x, a', b') - a'}{\Delta}\right) - 128 \quad (3)$$

$$\text{scale} = \frac{b' - a'}{255} \quad (4)$$

$$\text{zero\_point} = -\left(\frac{a'}{\Delta} + 128\right) \quad (5)$$

Given input feature maps X, output feature maps Y, and weights W for a given layer of the neural network, these can be respectively quantized based on Equations (6), (7), and (8):

$$X = x_{scale}(X_{int8} - x_{zero\_point}) \quad (6)$$

$$Y = y_{scale}(Y_{int8} - y_{zero\_point}) \quad (7)$$

$$W = w_{scale}(W_{int8} - w_{zero\_point}) \quad (8)$$

For the sake of illustration, and without loss of generality, assume that X, Y, and W are all N×N matrices. Then:

$$y_{scale}(Y_{int8}[i, k] - y_{zero\_point}) = \quad (9)$$
$$\sum_{j=1}^{N} x_{scale}(X_{int8}[i, j] - x_{zero\_point}) w_{scale}(W_{int8}[j, k] - w_{zero\_point})$$

$$Y_{int8}[i, k] = \quad (10)$$
$$y_{zero\_point} + M \sum_{j=1}^{M} (X_{int8}[i, j] - x_{zero\_point})(W_{int8}[j, k] - w_{zero\_point})$$

where X[i,j] is the (i,j)-th element of matrix X and $$M = \frac{x_{scale} w_{scale}}{y_{scale}}.$$

The only non-integer in the above equation is M, which can be computed offline.

Assuming that M∈(0,1) and let M=$2^{-n}M_0$, where $M_0 \in$ [0.5,1) and n is a non-negative integer. Then $M_0$ can be represented using the INT32 value that is nearest to $2^{31}$ M. Because $M_0 \geq 0.5$, this value is always at least $2^{30}$ and therefore always has at least 30 bits.

Now considering the summation:

$$\sum_{j=1}^{N} (X_{int8}[i, j] - x_{zero\_point})(W_{int8}[j, k] - w_{zero\_point}) = \quad (11)$$

$$\underbrace{\sum_{j=1}^{N} X_{int8}[i, j] W_{int8}[j, k]}_{(1)} - \underbrace{x_{zero\_point} \sum_{j=1}^{N} W_{int8}[j, k]}_{(2)} -$$

$$\underbrace{w_{zero\_point} \sum_{j=1}^{N} W_{int8}[i, j]}_{(3)} + \underbrace{N x_{zero\_point} w_{zero\_point}}_{(4)}$$

If the weight zero_point ($w_{zero\_point}$) is zero, then sub-expression (3) of Equation (11) does not need to be computed. (Otherwise, sub-expression (3) will need to be re-computed for every inference made by the neural network as the activation changes). Note that sub-expressions (2) and (4) of Equation (11) can be pre-calculated and stored as constants because they are fixed once quantized weights are fixed.

Accordingly, in view of the above discussion, the calibration of quantization parameters for the weights and activations of layers of the neural network can significantly impact performance, such as by setting the weight zero_point to zero and by setting the activation zero_point based on the asymmetrical activation functions used in the layers.

As noted above, the weights of a trained neural network are stored within the trained model, and the minimum, maximum, and distribution of those weights can be read directly from trained model. However, statistical characteristics of the activations (e.g., minimum and maximum) are needed in order to perform post-training quantization of the activations. In many circumstances it is impractical or impossible to use the original training data for performing the post-training quantization of the activations. For example, the training data may be private data (e.g., where the training is performed using federated learning) or otherwise inaccessible for privacy and/or security reasons (e.g., medical data and biometric data). As another example, the pre-trained model may be trained by one party and then sold or licensed to a second party, where the second party desires to quantize the pre-trained model for use on their particular hardware, which may have particular resource constraints (e.g., based on native word size and/or vector size of a processor for performing inferences using the model).

Accordingly, aspects of embodiments of the present disclosure relate to systems and methods for data-free post-training quantization, e.g., post-training quantization without the use of the original training data that was used to train the statistical model. In addition, some aspects of embodiments of the present disclosure relate to systems and methods for generating synthetic data that is representative of the data used to train the pre-trained model.

Figure 2:
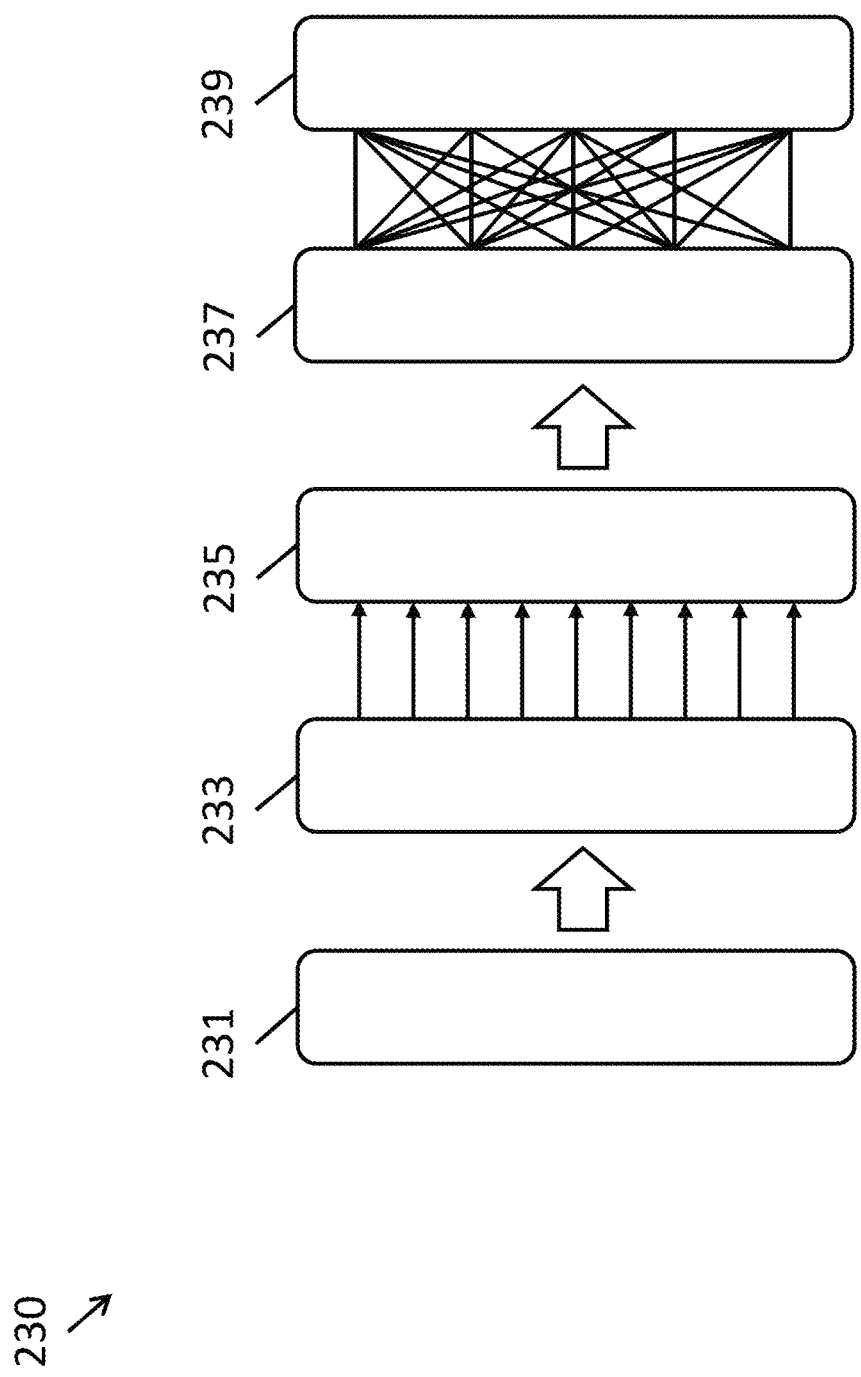
FIG. 2 is a schematic depiction of a portion of a statistical model, in particular, a portion of a neural network including a batch normalization layer.

Batch normalization refers to a technique in which one or more batch normalization layers are added to a neural network to normalize the inputs to the layer based on statistical characteristics of those inputs based on the training data. FIG. 2 is a schematic depiction of a portion of a statistical model, in particular, a portion of a neural network including a batch normalization layer. See, e.g., Ioffe, Sergey, and Christian Szegedy. "Batch normalization: Accelerating deep network training by reducing internal covariate shift." *arXiv preprint arXiv*:1502.03167 (2015). In the example shown in FIG. 2, the portion of the neural network 230 may include a first convolutional layer 231, a second convolutional layer 233, a batch normalization layer 235, a third convolutional layer 237, and a fully connected layer 239. During training, the training data is typically divided into multiple "batches" to improve efficiency (e.g., because the entire training data set may not fit into the memory of the computer, and performance can be increased by avoiding reads from disk or other mass storage devices). The samples from each batch are supplied to an input layer of the neural network, and activations computed by each layer for a given input are fed into a following layer. For example, activations computed by first convolutional layer 231 are supplied as input to the second convolutional layer 233, which supplies its activations to the batch normalization layer 235. The batch normalization layer 235 normalizes its inputs, as received from the previous layer (e.g., layer 233 as shown in FIG. 2) for the current batch of training data (e.g., by computing a mean and variance of the inputs for the batch of training data) and normalizing those inputs to have the same mean and variance). The normalized versions of the inputs are then supplied to the next layer in the network (e.g., layer 237 as shown in FIG. 2). After training is complete, the mean and variance as calculated from the entire training data set are stored in the batch normalization layer 235 such that, during inference, the inputs to the batch normalization layer 235 are adjusted based on the mean and variance of the training data set. Accordingly, each batch normalization layer of a pre-trained network stores statistical characteristic information that reflect the statistical distribution of the outputs of the previous layer in response to the training data (as processed through the previous layers of the neural network).

Some aspects of embodiments of the present disclosure relate to use of the statistical characteristics stored in one or more batch normalization layers of a pre-trained model to train or re-train a generator or generative model to generate synthetic data that is statistically similar to the original training data. Generally, a generator or generative model is a statistical model that simulates a target data distribution. Examples of generators trained using various techniques include generative adversarial networks (GANs) and variational autoencoders (VAE) (see, e.g., respectively, Goodfellow, Ian, et al. "Generative adversarial nets." *Advances in neural information processing systems*. 2014. and Kingma, Diederik P., and Max Welling. "Auto-encoding variational bayes." *arXiv preprint arXiv*:1312.6114 (2013).). While some embodiments of the present disclosure are described herein with respect to using statistical characteristic information stored in one or more batch normalization layers, embodiments of the present disclosure are not limited thereto and may be applied to other circumstances in which portions of a pre-trained model include stored statistical characteristic information reflective of the statistical distribution of the samples in the training data.

In some embodiments of the present disclosure, the generator is a non-conditional generator, while in other embodiments of the present disclosure, the generator is a conditional generator. A generator according to embodiments of the present disclosure that is trained to generate synthetic data that is statistically similar to original training data can then be used for a variety of purposes, including performing post-training quantization of the pre-trained model having the one or more batch normalization layers from which statistics were extracted, or for performing post-training quantization of a different pre-trained model that was trained on the same training data. Other uses of a trained generator in accordance with embodiments of the present disclosure may include, for example, measuring the performance of a compressed model after applying other model compression techniques such as weight pruning, neural network architecture search (e.g., experimenting with the performance of different neural network architectures), federated learning, and continual learning.

As noted above, in some embodiments of the present disclosure, the pre-trained generator is, or includes, a generative adversarial network (GAN). A GAN is a class of machine learning frameworks in which two neural networks compete (e.g., in an adversarial manner) in order to train one another, based on a given training data set. One neural network may be referred to as a generative network (or student network) and the other neural network may be referred to as a discriminative network (or teacher network). The generative network or generator generates synthetic outputs based on a random input (e.g., from a randomness source such as a pseudorandom number generator) and optionally also based on some specified inputs (referred to as "conditions"), and the discriminative network or discriminator is trained to determine whether a given input was synthesized by the generative network or corresponds to a "real" input. By alternating between training the generator to generate outputs that will cause the discriminator to classify the synthesized outputs of the generator as being real input and training the discriminator to distinguish between real inputs and synthetic inputs synthesized by the generator, the performance of both networks can improve until the generator produces outputs that may be sufficiently good for purposes outside of training.

One example of adversarial training is training a generative network to synthesize photorealistic images of human faces (e.g., a photorealistic image that does not depict any actual person), where the discriminative network is trained to determine whether a given image depicts a real human face or a synthesized image of a human face. See, e.g., Goodfellow, Ian J., et al. "Generative adversarial networks." *Advances in neural information processing systems* 3.06 (2014).) While some aspects of embodiments of the present disclosure are described in the context of generative adversarial networks, embodiments of the present disclosure are not limited thereto and other types of generators may be used.

Figure 3:
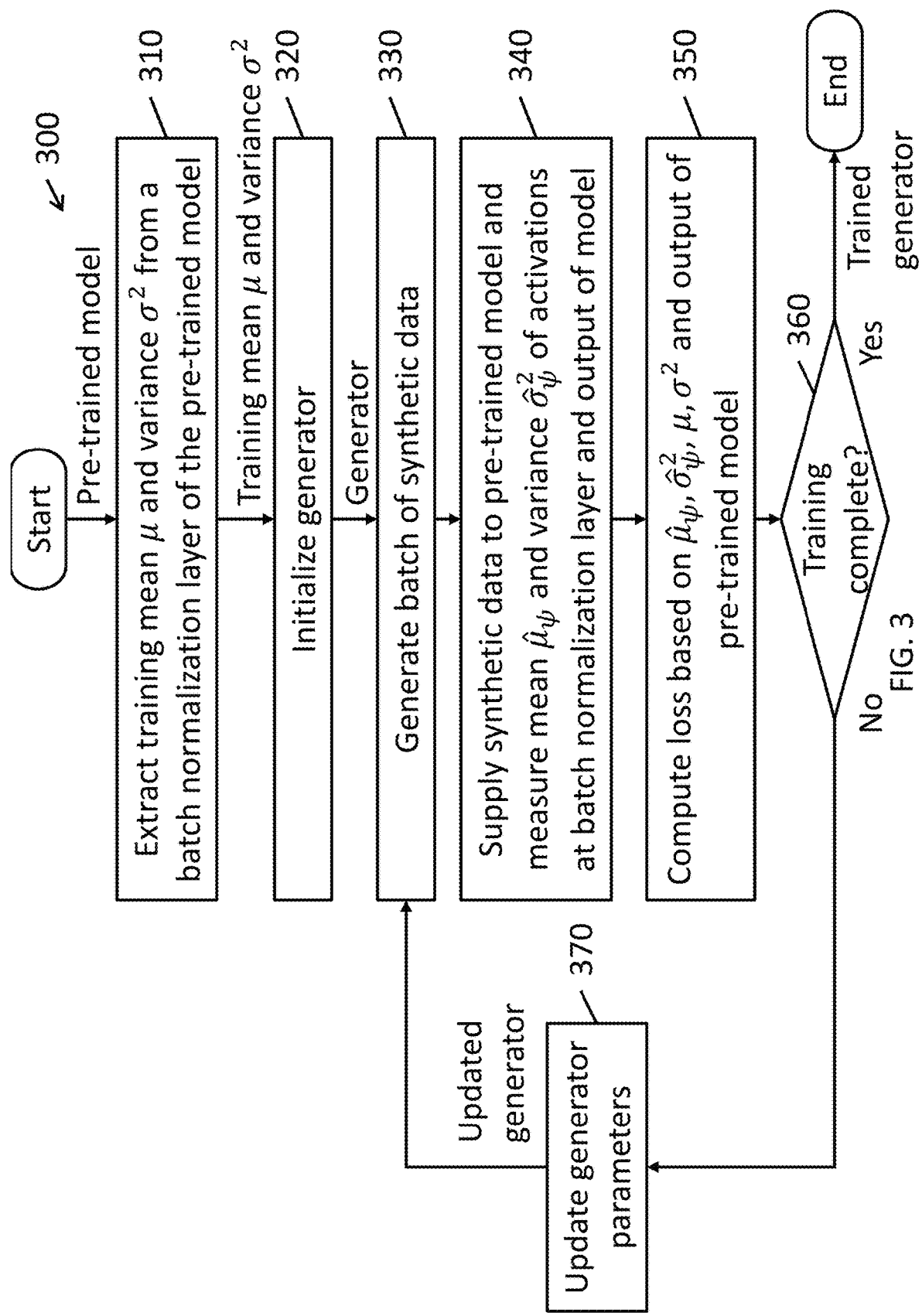
FIG. 3 is a flowchart depict a method according to one embodiment of the present disclosure for training a generator based on a pre-trained model.
Figure 4:
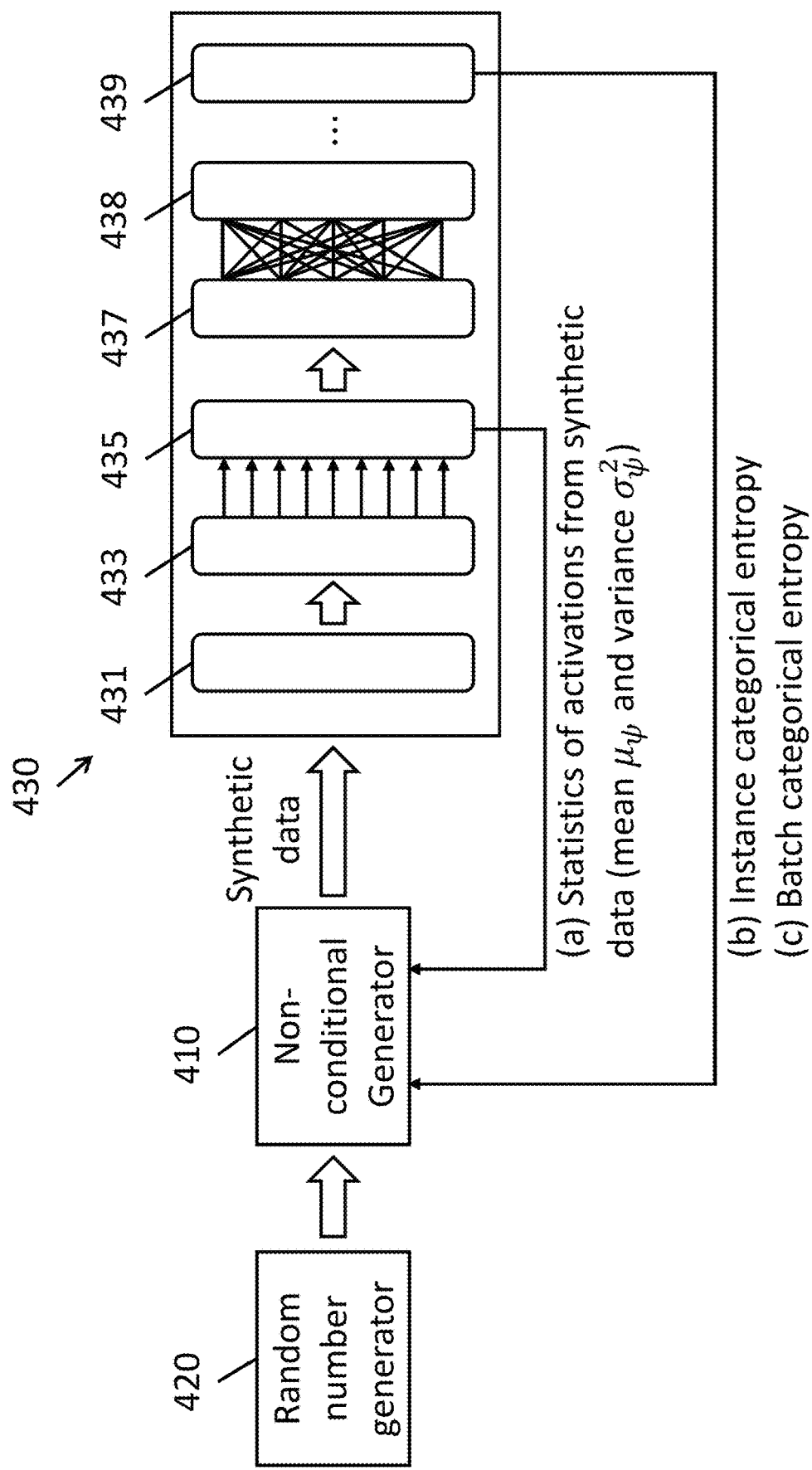
FIG. 4 is a block diagram depicting a process of training a non-conditional generator according to one embodiment of the present disclosure.

FIG. 3 is a flowchart depict a method according to one embodiment of the present disclosure for training a generator based on a pre-trained model. FIG. 4 is a block diagram depicting a process of training a non-conditional generator according to one embodiment of the present disclosure. The following discussion will refer to a process for training a non-conditional generator, differences with respect to training a conditional generator will be described in more detail below with respect to FIG. 5. Computational processes for training a generator in accordance with embodiments of the present disclosure may be implemented using one or more computer systems including a processor and memory and, in some circumstances, including one or more co-processors such as a graphical processing unit (GPU), a dedicated application specific integrated circuit (ASIC) configured to accelerate computations related to deep learning (e.g., specialized for computing activation functions and dot products), and/or other vector processors. For the sake of clarity, the computer system may be referred to herein as a generator training system of a model compression system 40, where the model compression system 40 comprises a processor and memory. Program instructions stored in the memory (e.g., stored in non-volatile memory) are then executed by the processor to implement a generator training system to perform operations as described herein to train a generator in accordance with embodiments of the present disclosure.

Referring to FIG. 3 and FIG. 4, a method 300 for training a non-conditional generator 410 based on a pre-trained model 430 includes extracting, in operation 310, statistical characteristic information regarding the training data used to train the pre-trained model 430 based on parameters stored in a batch normalization layer 435 of the pre-trained model. In some embodiments, the extracted statistical characteristic information includes a training mean $\mu$ and a training variance $\sigma^2$ of the outputs or activations of a layer 433 immediately preceding the batch normalization layer 435 as computed across the training data used to train the pre-trained model 430. The batch normalization layer 435 stores these statistical characteristic information in order to apply normalization during inference, such as shifting the activations in accordance with the training mean $\mu$ and scaling the data in accordance with the training variance $\sigma^2$ as computed based on the training data.

In operation 320 the generator training system initializes a generator model. This may include, for example, initializing a generator with random weights, or loading a previously-trained generator to be retrained through method 300 to generate a pre-trained generator that generates data that is statistically similar to the training data. For example, an existing generator may be previously trained to generate images that resemble the images that appear in the ImageNet data set. Methods according to embodiments of the present disclosure re-train this pre-trained generator to generate images that resemble the images that were used to train the pre-trained model 430.

In operation 330, the generator is used to generate a batch of synthetic data, such as one or more synthetic images. The generator 410 deterministically produces synthetic data based on a given input. In order to generate a variety of different data, the input to the generator may be a random input from a random number generator 420 (e.g., a random number generator (RNG) such as a hardware random number generator that generates random numbers from a physical process or a pseudorandom number generator (PRNG), examples of which include Mersenne twister (MT), multiply-with-carry (MWC), SplitMix, and permuted congruential generator (PEG)). The synthesized data are supplied to the pre-trained model and the activations at the batch normalization layer are measured to obtain measured statistical characteristics including a measured mean $\hat{\mu}_\psi$ and a measured variance $\hat{\sigma}_\psi^2$ as computed based on the synthesized data. In addition, the output of the model is also captured (e.g., the output of a softmax output layer of the pre-trained model 430). For example, in the case of a pre-trained model configured to perform classification, the outputs include the particular classes of objects that are detected in the synthetic data (e.g., classifications of objects detected in images synthesized by the generator 410).

In operations 330, 340, 350, 360, and 370, the generator training system iteratively update the parameters of the generator 410 such that the generator 410 produces data that is more similar to the original training data that was used to train the pre-trained model. In particular, this may include adjusting the parameters based on matching the measured statistical characteristics such as the measured mean $\hat{\mu}_\psi$ and the measured variance $\hat{\sigma}_\psi^2$ with the training statistical characteristics such as the training mean $\mu$ and the training variance $\sigma^2$ extracted from the batch normalization layer. In some embodiments involving the training of a non-conditional generator, this may also include reducing the entropy for the output categorical distribution (the softmax output) of each sample and/or increasing the entropy for the output categorical distribution (e.g., the softmax output) over the batch of data generated by the generator 410 during the current training iteration.

In more detail, in operation 350, the generator training system computes a training loss based on the measured mean $\hat{\mu}_\psi$ and the measured variance $\sigma$ measured from the current batch of synthetic data, the training mean $\mu$ and training variance $\sigma^2$ extracted from the batch normalization layer. In some embodiments, the distance between the measured mean $\hat{\mu}_\psi$ and the measured variance $\hat{\sigma}_\psi^2$ from the training mean $\mu$ and training variance $\sigma^2$ is computed based on a Kullback-Leibler (KL) divergence $\mathcal{D}_\mathcal{N}$. In the case of a convolutional neural network with one or more batch normalization layers, this loss function $L_\psi$ may be represented as shown in Equation (12):

$$L_\psi = \sum_{l,c} \mathcal{D}_N((\hat{\mu}_\psi(l, c), \hat{\sigma}^2_\psi(l, c)), (\mu(l, c), \sigma^2(l, c))) \qquad (12)$$

$$\mathcal{D}_N((\hat{\mu}, \hat{\sigma}^2), (\mu, \sigma^2)) = \frac{(\hat{\mu} - \mu)^2 + \hat{\sigma}^2}{2\sigma^2} - \log\frac{\hat{\sigma}}{\sigma} - \frac{1}{2} \qquad (13)$$

where l corresponds to a batch normalization index (e.g., identifying a particular batch normalization layer of the convolutional neural network embodiment of the pre-trained model 430) and c refers to a channel index of the input to an l-th batch normalization layer (e.g., when the inputs to the batch normalization layer include a plurality of channels, such as red, green, and blue channels if the batch normalization layer is the first layer of the convolutional neural network embodiment of the pre-trained model 430).

As noted above, in some embodiments of the present disclosure, the loss function $L_\psi$ further includes a term to reduce instance categorical entropy. Generally, when the pre-trained model 430 is a classifier that is sufficiently trained to perform accurate classifications, a given input to the pre-trained model 430 is expected to generate a high probability or high confidence for exactly one category or classification and low probabilities for all of the other categories (e.g., high confidence that an image depicts a cat and low probability that it depicts a dog, a human, a car, etc.). In some circumstances, this probability or confidence may be evaluated on a per-pixel basis, such as in the case where the pre-trained model is an instance segmentation network that computes a segmentation map classifying different portions of an input image with different classes (e.g., identifying portions of the image that depict cats versus dogs, versus humans, versus cars). When the classifier is trained well and the training data provides clean inputs, then pre-trained classifier should output only one class (e.g., exactly one class) with high confidence for a given sample of the training data. This corresponds to low entropy (the entropy is minimized to zero if one category has probability of 1 and the other categories have probability zero).

In contrast, multiple classes with high probability, or having the probability spread among the various classes indicates high instance categorical entropy. Measuring high instance categorical entropy suggests that the pre-trained model 430 has failed to classify the given input data. In the case of synthetic data generated by the generator 410 as configured with the current generator parameters and assuming that the pre-trained model 430 was properly trained, this may suggest that the synthetic data does not contain recognizable patterns or contains confusing or ambiguous patterns, as presented to the pre-trained model 430, where this ambiguity is unlikely to be reflective of the original training data. Accordingly, some aspects of embodiments of the present disclosure relate to minimizing the instance categorical entropy, e.g., tuning the parameters of the generator 410 such that any given sample of synthetic data that is supplied to the pre-trained model 430 causes the pre-trained model 430 to output a high probability for exactly one class (e.g., high confidence for one class in the case of an image classifier or high confidence for one class for any given pixel in the case of image segmentation). In some embodiments, this term is expressed as:

$$\mathbb{E}_{p(z)}[H(t_{\theta^*}(g_\psi(z)))]$$

where $g_\psi$ represents the generator being trained, z is the random input to the generator, $t_{\theta^*}$ represents the pre-trained model 430 that takes the output of the generator $g_\psi$ as its input, H(p) is the entropy of probability distribution p, and $\mathbb{E}_{p(z)}$ represents an expected value over probability distribution p.

In addition, in some embodiments of the present disclosure, the loss function $L_\psi$ further includes a term to reduce batch categorical entropy. Assuming that each class appears in the training dataset with similar probability, the categorical probability distribution averaged for any batch of data should tend to a uniform distribution where the entropy is maximized to $\log_2|C|$, where $|C|$ is the number of classes. Intuitively, the generator should be trained to generate synthetic samples that reflect all of the possible classes that the pre-trained model 430 is configured to detect (e.g., generate pictures of cats, dogs, humans, cars, bikes, etc. that appear in the training data set), and not just a few classes (e.g., only pictures that are classified as depicting cats). Therefore, the generator 410 may be trained such that, for any given batch of synthetic data, the various samples within the batch of synthetic data cause the pre-trained model 430 to generate outputs in different ones of the plurality of classes. In some embodiments, this term is expressed as:

$$H(\mathbb{E}_{p(z)}[t_{\theta^*}(g_\psi(z))])$$

Accordingly, in some embodiments of the present disclosure, the loss function $L_\psi$ further includes terms for reducing or minimizing the instance categorical entropy and increasing or maximizing the batch categorical entropy in accordance with:

$$L_\psi = \sum_{l,c} \mathcal{D}_N((\hat{\mu}_\psi(l, c), \hat{\sigma}^2_\psi(l, c)), (\mu(l, c), \sigma^2(l, c))) + \qquad (14)$$

$$\mathbb{E}_{p(z)}[H(t_{\theta^*}(g_\psi(z)))] - H(\mathbb{E}_{p(z)}[t_{\theta^*}(g_\psi(z))])$$

As such, in operation 350, the generator training system computes a training loss based on the loss function $L_\psi$ for the generator 410 based on the current batch of synthetic training data that was synthesized by the generator 410 in operation 330.

In operation 360, the generator training system determines whether the training is complete in accordance with a training completion condition, which may be based in part on the computed training loss. For example, if the loss has not significantly changed between the computed loss based on the current batch and a previous batch or if the loss has decreased below a threshold level or if a maximum number of training iterations or epochs has been reached, then the generator training system determines that training is complete. On the other hand, if the loss is still relatively high and/or is still showing improvement, then the generator training system proceeds to operation 370 to update the generator parameters in accordance with the loss.

In operation 370, the generator training system updates various generator parameters based on the loss. As noted above, in the case of a neural network (e.g., where the generator 410 is or includes a neural network), the parameters may include the weights and biases of layers within the neural network. Accordingly, updating the parameters of a neural network may involve applying stochastic gradient descent and backpropagation of the loss through the network to compute new weights and biases for the layers. In other embodiments of the present disclosure using different types of generators, different techniques may be used to update the parameters based on the loss. The generator training system then uses the updated generator to generate a new batch of synthetic data in operation 330 and the process continues with another iteration, including supplying the new batch of synthetic data to the pre-trained model 430 to compute new measured mean $\hat{\mu}_\psi$ and measured variance $\hat{\sigma}_\psi^2$ values, new outputs from the pre-trained model 430, and to compute an updated loss $L_\phi$ based on the updated generator 410.

When the generator training system determines in operation 360 that the training is complete (e.g., because the loss is no longer significantly improving or when the loss has decreased below a threshold acceptable level), then the trained generator may be output, e.g., based on the current parameters of the generator 410, as configured through method 300.

Figure 5:
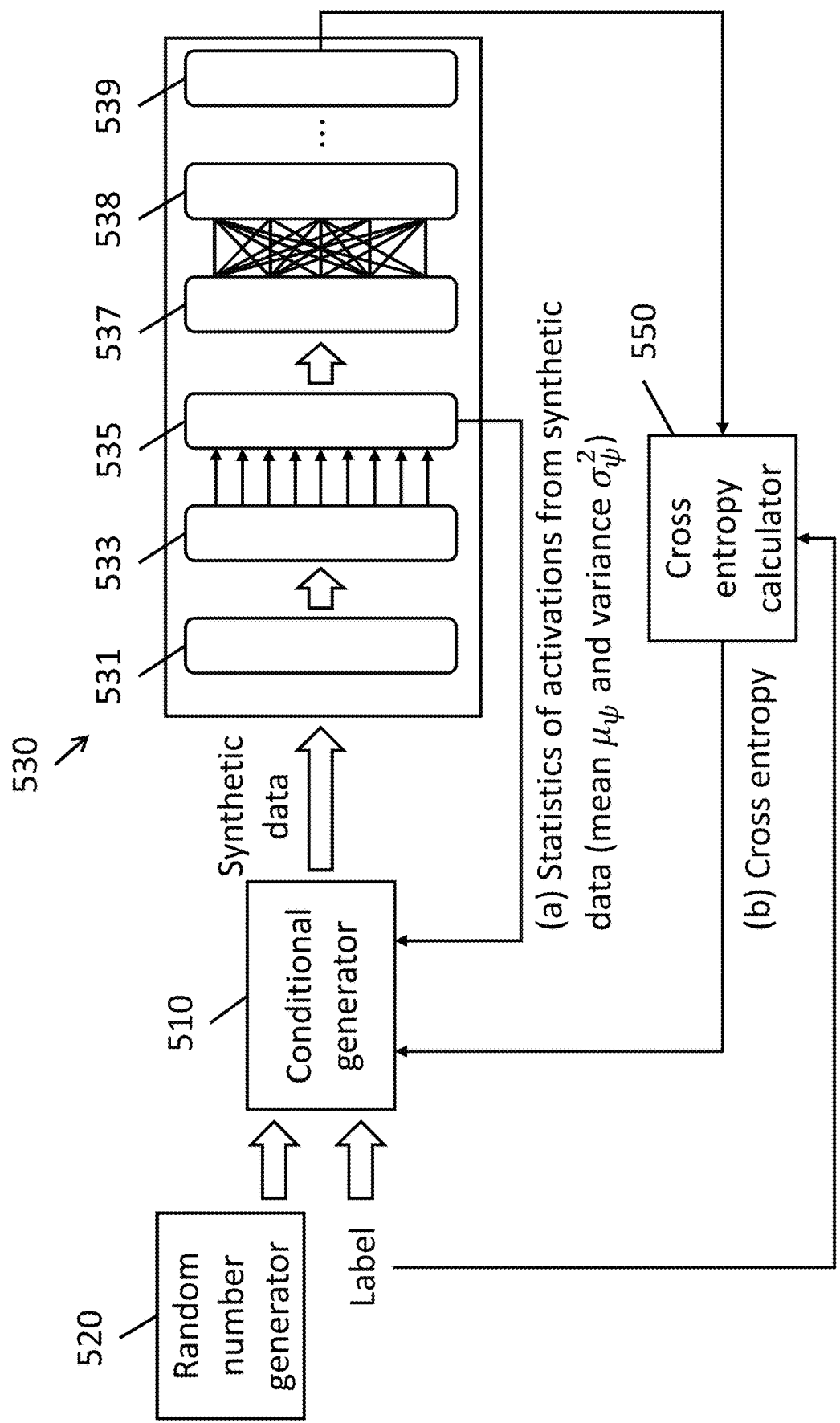
FIG. 5 is a block diagram depicting a process of training a conditional generator according to one embodiment of the present disclosure.

FIG. 5 is a block diagram depicting a process of training a conditional generator according to one embodiment of the present disclosure. The method of training a conditional generator 510 based on a pre-trained model 530 is substantially similar to the method for training a non-conditional generator 410 as shown in FIG. 4. In the embodiment of FIG. 5, the conditional generator 510 takes as input both a random input from a random number generator 520 and a condition. In the embodiment shown in FIG. 5, the condition is a particular label corresponding to the labels output by the pre-trained model 530. For example, in the case where the pre-trained model 530 is a classifier, the label may correspond to a particular class, and in the case of an image segmentation, the label may be a segmentation map indicating the classes of various portions of an image. The generator 510 may be trained to generate outputs based on the condition. Continuing the above example, in the case of generating images, if supplied with a label corresponding to the class "cat," the generator 510 may synthesize an image that would be classified by a trained classifier as depicting a cat.

Training a conditional generator 510 proceeds in a manner similar to that described above with respect to FIGS. 3 and 4 regarding the training of a non-conditional generator, including extracting the training mean µ and training variance $\sigma^2$ from one or more batch normalization layers of the pre-trained model 530, initializing the generator 510 in operation 320, generating a batch of synthetic data in operation 330, and supplying the synthetic data to the pre-trained model 530 in operation 340 to measure a mean $\hat{\mu}_\psi$ and a variance $\hat{\sigma}_\psi^2$ from the inputs to the one or more batch normalization layers and to capture the outputs of the model based on the synthetic data.

However, in operation 350, instead of minimizing an instance classification entropy and maximizing a batch classification entropy, in some embodiments involving the training of a conditional generator 510, a cross-entropy is minimized instead. In particular, in some embodiments, the cross-entropy between the label supplied to the generator 510 and the output from the pre-trained model is minimized. The model compression system 40 may implement a cross-entropy calculator 550, which may calculate the cross-entropy in accordance with:

$$\mathbb{E}_{p(z,l)}[H(l,t_{\theta^*}(g_\psi(z,l)))]$$

where l is the class label supplied as input to the generator $g_\psi$ and where H(q,r) is the cross-entropy between probability distributions q and r (in this case, the cross-entropy between the class label l and the classification computed by the pre-trained model $t_{\theta^*}$ based on the output of the conditional generator $g_\psi$).

Accordingly, in these embodiments involving the training of a conditional generator, the loss function $L_\psi$ may be represented expressed as:

$$L_\psi = \sum_{l,c} \mathcal{D}_N((\hat{\mu}_\psi(l,c), \hat{\sigma}_\psi^2(l,c)), (\mu(l,c), \sigma^2(l,c))) + \quad (15)$$

$$\mathbb{E}_{p(z,l)}[H(l, t_{\theta^*}(g_\psi(z,l)))]$$

The remaining operations, including determining whether training is complete in operation 360 and updating the generator parameters in operation 370 may proceed as discussed above with respect to FIGS. 3 and 4.

Figure 6:
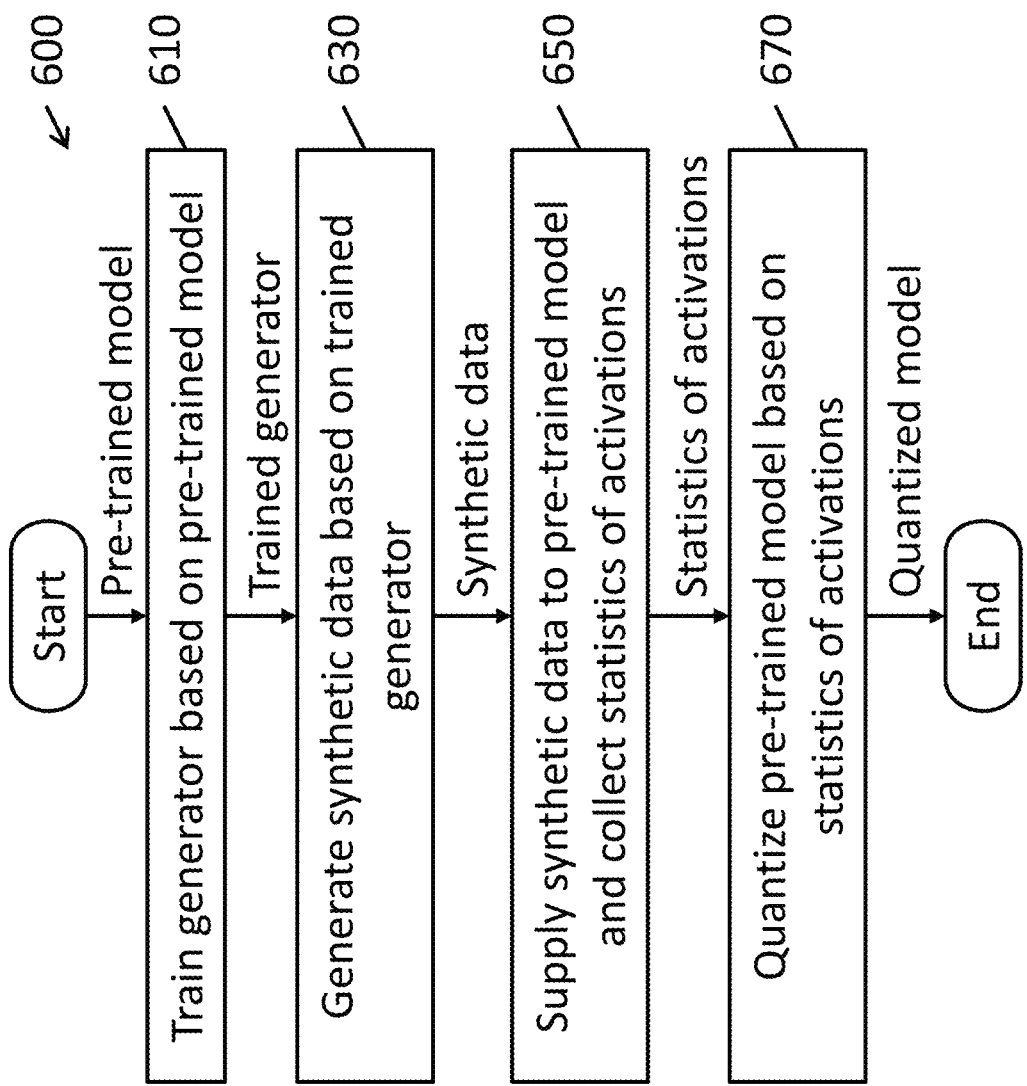
FIG. 6 is a flowchart depicting a method for quantizing a pre-trained model based on a generator configured based on a source pre-trained model.

FIG. 6 is a flowchart depicting a method for quantizing a pre-trained model based on a generator configured based on a source pre-trained model. The method 600 for compressing a pre-trained model 30 may be performed by the model compression system 40, and the particular method shown in FIG. 6 relates to model compression based on quantization of activations. In operation 610, the model compression system 40 trains a generator based on a received pre-trained model 30 such that the generator is trained to synthesize data that is statistically similar to the training data that was used to train the pre-trained model 30. In some embodiments, the generator is trained in operation 610 in accordance with the methods described above with respect to FIG. 3, which may train a non-conditional generator (e.g., in accordance with embodiments shown in FIG. 4) or a conditional generator (e.g., in accordance with embodiments shown in FIG. 5).

In operation 630, the model compression system 40 uses the trained generator to generate additional synthetic data for performing the model compression, such as by using a randomness source such as a random number generator. The synthetic data for performing model compression may include a plurality of different samples, where each individual sample may produce different activations between the layers of the pre-trained model 30 and different final outputs from the pre-trained model. As noted above the trained generator is trained to generate data that is statistically similar to the original training data (e.g., generates activations in the pre-trained model having similar mean and variance as the activations generated by the original training data).

In operation 650, the model compression system 40 supplies the model compression synthetic data to the pre-trained model 30 and collects statistical characteristic information about the activations of the various layers, such as the range (minimum and maximum) of the activations.

In operation 670, the model compression system 40 quantizes the pre-trained model 30 based on the statistical characteristic information about the activations of the layers. Details of techniques for quantization of a pre-trained model 30 based on statistical characteristic information about the activations of the layers are described above with respect to Equations (1) through (11). In some embodiments, in operation 670, the model compression system 40 also quantizes the parameters of the pre-trained model (e.g., the weights of a neural network), such as by converting the parameters from a floating-point representation such as FP32 to an integer representation such as INT8.

Figure 7A:
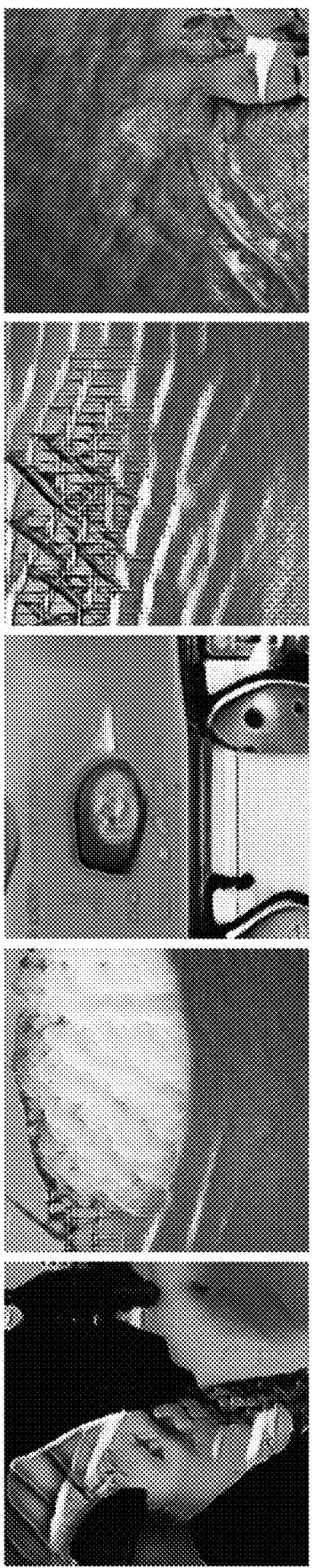
FIG. 7A depicts examples of images synthesized by a non-conditional generator trained in accordance with embodiments of the present disclosure based on parameters from a trained ResNet-18 convolutional neural network.
Figure 7B:
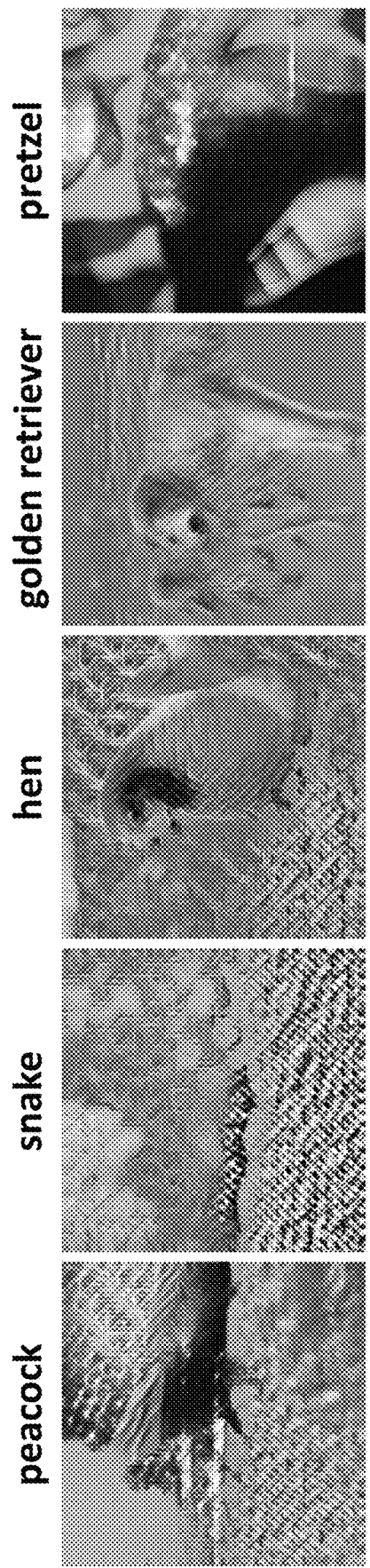
FIG. 7B depicts examples of images synthesized by a conditional generator trained in accordance with embodiments of the present disclosure based on parameters from a trained ResNet-18 convolutional neural network.

FIG. 7A depicts examples of images synthesized by a non-conditional generator trained in accordance with embodiments of the present disclosure based on parameters from a trained ResNet-18 convolutional neural network. As seen in FIG. 7A, while the five images (generated by supplying different random inputs to the generator) generally look like photographs, they do not appear to depict anything in particular. FIG. 7B depicts examples of images synthesized by a conditional generator trained in accordance with embodiments of the present disclosure based on parameters from a trained ResNet-18 convolutional neural network, along with the label supplied to the generator as a condition. As seen in FIG. 7B, the five images generally look like photographs and contain some characteristics that resemble the supplied conditional label (e.g., the general shape of a dog's head is visible near the center of the image labeled "golden retriever"). Images generated in this manner may be used, for example, to compress a trained ResNet-18 convolutional neural network.

Accordingly, aspects of embodiments of the present disclosure relate to systems and method for performing post-training quantization of a pre-trained model without the original training data that was used to train the pre-trained model. In more detail, some aspects of embodiments of the present disclosure relate to training a generator to generate synthetic data that is statistically similar to the original training data. The generator may be trained in accordance with a loss function that includes terms relating to minimizing a difference between the training mean $\mu$ and training variance $\sigma^2$ of activations supplied as inputs to one or more batch normalization layers of a deep neural network and measured mean $\hat{\mu}_\psi$ and variance $\hat{\sigma}_\psi^2$ of the activations supplied as inputs to the same one or more batch normalization layers when the data synthesized by the generator is supplied as input to the network. The loss function may also include other terms relating to the entropy of the data synthesized by the generator. This trained generator may then be used to generate inputs to the pre-trained model in order to measure statistical characteristics of the activations of all of the layers of the pre-trained model (in addition to the one or more batch normalization layers), and the statistical characteristics (e.g., the range of the activations) are then used to perform quantization of the pre-trained model for model compression.

While FIG. 6 depicts an embodiment in which the statistical model to be quantized and the statistical model that is used to train the generator are the same trained model, embodiments of the present disclosure are not limited thereto. For example, a first pre-trained model may be used to train a generator as described above with respect to FIGS. 3, 4, and 5, and that generator may be used to quantize a second pre-trained model that was trained on the same set of training data as the first pre-trained model.

In addition, generators trained in accordance with embodiments of the present disclosure are not limited to use in performing model compression of a pre-trained model through model quantization. For example, embodiments of the present disclosure may be applied to other forms of model compression such as network pruning. In the case of network pruning, a conditional generator may be used to generate images based on a conditional label, where the pre-trained network is expected to classify the generated images in a manner consistent with the labels supplied to the generator (e.g., an image synthesized by the generator with the conditional label "cat" should be classified by the pre-trained model as "cat"). The data synthesized by the generator can then be used to confirm that the output of the model does not change as connections are pruned (e.g., the weights of various connections are set to zero). Accordingly, embodiments of the present disclosure enable model compression through network pruning without access to the original training data set that was used to train the pre-trained model.

As another example, some embodiments relate to training new neural networks and improving the accuracy of networks by retraining neural networks using a generator trained in accordance with embodiments of the present disclosure. For example, a trained conditional generator according to some embodiments of the present disclosure may be used to generate synthetic data for training a new neural network (e.g., having a different architecture than the source pre-trained model or having a smaller number of output classes) or retraining an existing neural network (e.g., by generating additional training data to refine the parameters of the neural network).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for training a generator for synthesizing data, the method comprising:

extracting, by a generator training system comprising a processor and memory, a plurality of training statistical characteristics from a batch normalization layer of a pre-trained model trained on original training data to compute, for an input, a plurality of classification confidences corresponding to a plurality of classes, the training statistical characteristics comprising a training mean $\mu$ and a training variance $\sigma^2$;

initializing, by the generator training system, a generator configured with a plurality of generator parameters;

generating, by the generator training system, a batch of synthetic data using the generator, the batch of synthetic data comprising a batch of synthetic image, audio, or text data;

supplying, by the generator training system, the batch of synthetic data to the pre-trained model;

measuring, by the generator training system, a plurality of measured statistical characteristics of activations at the batch normalization layer of the pre-trained model and the output of the pre-trained model in response to the batch of synthetic data, the measured statistical characteristics comprising a measured mean $\hat{\mu}_\psi$ and a measured variance $\hat{\sigma}_\psi^2$;

training, by the generator training system, the generator by updating the generator parameters of the generator based on a training loss computed in accordance with a loss function $L_\psi$ based on the training mean $\mu$, the training variance $\sigma^2$, the measured mean $\hat{\mu}_\psi$, and the measured variance $\hat{\sigma}_\psi^2$;

generating, by the generator training system, a second batch of synthetic data using the generator configured with the updated generator parameters;

supplying, by the generator training system, the second batch of synthetic data to the pre-trained model;

measuring, by the generator training system, a second plurality of measured statistical characteristics of activations at the batch normalization layer of the pre-trained model and the output of the pre-trained model in response to the second batch of synthetic data, the measured statistical characteristics comprising a second measured mean $\hat{\mu}_\psi$ and a second measured variance $\hat{\sigma}_\psi^2$; and updating the generator parameters in accordance with a second training loss computed in accordance with the loss function $L_\psi$ based on the training mean $\mu$, the training variance $\sigma^2$, the second measured mean $\hat{\mu}_\psi$, and the second measured variance $\hat{\sigma}_\psi^2$ to compute a trained generator configured to generate synthetic data comprising synthetic image, audio, or text data that is statistically similar to the original training data comprising original image, audio, or text data that was used to train the pre-trained model, wherein the generator is a non-conditional generator, and wherein the loss function $L_\psi$ comprises:

a term for reducing an instance categorical entropy of an output of the pre-trained model in response to the batch of synthetic data, wherein the instance categorical entropy for a sample of the batch of synthetic data is minimized when one class of the plurality of classes has a classification confidence of one and the other classes of the plurality of classes have classification confidences of zero; and a term for increasing a batch categorical entropy of the output of the pre-trained model in response to the batch of synthetic data, wherein the batch categorical entropy is maximized when the batch of synthetic data includes an equal number of samples from all of the plurality of classes.

2. The method of claim 1, wherein the loss function $L_\psi$ comprises a term that computes a distance between the training mean $\mu$ and the measured mean $\hat{\mu}_\psi$, and between the training variance $\sigma^2$ and the measured variance $\hat{\sigma}_\psi^2$.

3. The method of claim 2, wherein the distance is computed based on a Kullback-Leibler (KL) divergence $\mathcal{D}_\mathcal{N}$.

4. The method of claim 3, wherein the pre-trained model is a convolutional neural network and the loss function $L_\psi$ includes a term for the KL divergence:

$$\sum_{l,c} \mathcal{D}_\mathcal{N}((\hat{\mu}_\psi(l,c), \hat{\sigma}_\psi^2(l,c)), (\mu(l,c), \sigma^2(l,c)))$$

where l corresponds to a batch normalization index, c corresponds to a channel index of the input to an l-th batch normalization layer, and $$\mathcal{D}_\mathcal{N}((\hat{\mu}, \hat{\sigma}^2), (\mu, \sigma^2)) = \frac{(\hat{\mu}-\mu)^2 + \hat{\sigma}^2}{2\sigma^2} - \log\frac{\hat{\sigma}}{\sigma} - \frac{1}{2}.$$

5. The method of claim 1, wherein the term for reducing the instance categorical entropy is expressed as:

$$\mathbb{E}_{p(z)}[H(t_{\theta^*}(g_\psi(z)))]$$

wherein the term for increasing the batch categorical entropy is expressed as:

$$H(\mathbb{E}_{p(z)}[t_{\theta^*}(g_\psi(z))])$$

where $t_{\theta^*}$ represents the pre-trained model, $g_\psi$ represents the generator being trained, z is a random input to the generator, H(p) is the entropy of probability distribution p, and $\mathbb{E}_{p(z)}$ represents an expected value over probability distribution p.

6. The method of claim 1, further comprising performing model compression on the pre-trained model using the generator by:

generating additional synthetic data based on the generator;

supplying the additional synthetic data to the pre-trained model;

collecting statistics of activations of the pre-trained model; and quantizing the pre-trained model based on the statistics of activations of the pre-trained model.

7. The method of claim 1, further comprising performing model compression on a second pre-trained model, the pre-trained model and the second pre-trained model being trained using a same set of training data, by:

generating additional synthetic data based on the generator;

supplying the additional synthetic data to the second pre-trained model;

collecting statistics of activations of the second pre-trained model; and quantizing the second pre-trained model based on the statistics of activations of the second pre-trained model.

8. A system for training a generator for synthesizing data comprises:

a processor; and a memory storing instructions that, when executed by the processor, cause the processor to:

extract a plurality of training statistical characteristics from a batch normalization layer of a pre-trained model trained on original training data to compute, for an input, a plurality of classification confidences corresponding to a plurality of classes, the training statistical characteristics comprising a training mean $\mu$ and a training variance $\sigma^2$;

initialize a generator configured with a plurality of generator parameters;

generate a batch of synthetic data using the generator, the batch of synthetic data comprising a batch of synthetic image, audio, or text data;

supply the batch of synthetic data to the pre-trained model;

measure a plurality of measured statistical characteristics of activations at the batch normalization layer of the pre-trained model and the output of the pre-trained model in response to the batch of synthetic data, the measured statistical characteristics comprising a measured mean $\hat{\mu}_\psi$ and a measured variance $\hat{\sigma}_\psi^2$;

train the generator by updating the generator parameters of the generator based on a training loss computed in accordance with a loss function $L_\psi$ based on the training mean $\mu$, the training variance $\sigma^2$ the measured mean $\hat{\mu}_\psi$, and the measured variance $\hat{\sigma}_\psi^2$;

generate a second batch of synthetic data using the generator configured with the updated generator parameters;

supply the second batch of synthetic data to the pre-trained model;

measure a second plurality of measured statistical characteristics of activations at the batch normalization layer of the pre-trained model and the output of the pre-trained model in response to the second batch of synthetic data, the measured statistical characteristics comprising a second measured mean $\hat{\mu}_\psi$ and a second measured variance $\hat{\sigma}_\psi^2$; and update the generator parameters in accordance with a second training loss computed in accordance with the loss function $L_\psi$ based on the training mean $\mu$, the training variance $\sigma^2$, the second measured mean $\hat{\mu}_\psi$, and the second measured variance $\hat{\sigma}_\psi^2$ to compute a trained generator configured to generate synthetic data comprising synthetic image, audio, or text data that is statistically similar to the original training data comprising original image, audio, or text data that was used to train the pre-trained model, wherein the generator is a non-conditional generator, and wherein the loss function $L_\psi$ comprises:

a term for reducing an instance categorical entropy of an output of the pre-trained model in response to the batch of synthetic data, wherein the instance categorical entropy for a sample of the batch of synthetic data is minimized when one class of the plurality of classes has a classification confidence of one and the other classes of the plurality of classes have classification confidences of zero; and a term for increasing a batch categorical entropy of the output of the pre-trained model in response to the batch of synthetic data, wherein the batch categorical entropy is maximized when the batch of synthetic data includes an equal number of samples from each of the plurality of classes.

9. The system of claim 8, wherein the loss function $L_\psi$ comprises a term that computes a distance between the training mean $\mu$ and the measured mean $\hat{\mu}_\psi$, and between the training variance $\sigma^2$ and the measured variance $\hat{\sigma}_\psi^2$.

10. The system of claim 9, wherein the distance is computed based on a Kullback-Leibler (KL) divergence $\mathcal{D}_\mathcal{N}$.

11. The system of claim 10, wherein the pre-trained model is a convolutional neural network and the loss function $L_\psi$ includes a term for the KL divergence:

$$\sum_{l,c} \mathcal{D}_\mathcal{N}((\hat{\mu}_\psi(l,c), \hat{\sigma}_\psi^2(l,c)), (\mu(l,c), \sigma^2(l,c)))$$

where l corresponds to a batch normalization index, c corresponds to a channel index of the input to an l-th batch normalization layer, and $$\mathcal{D}_\mathcal{N}((\hat{\mu}, \hat{\sigma}^2), (\mu, \sigma^2)) = \frac{(\hat{\mu}-\mu)^2 + \hat{\sigma}^2}{2\sigma^2} - \log\frac{\hat{\sigma}}{\sigma} - \frac{1}{2}.$$

12. The system of claim 8, wherein the term for reducing the instance categorical entropy is expressed as:

$$\mathbb{E}_{p(z)}[H(t_{\theta*}(g_\psi(z)))]$$

wherein the term for increasing the batch categorical entropy is expressed as:

$$H(\mathbb{E}_{p(z)}[t_{\theta*}(g_\psi(z))])$$

where $t_{\theta*}$ represents the pre-trained model, $g_\psi$ represents the generator being trained, z is a random input to the generator, H(p) is the entropy of probability distribution p, and $\mathbb{E}_{p(z)}$ represents an expected value over probability distribution p.

13. The system of claim 8, wherein the memory further stores instructions for performing model compression on the pre-trained model using the generator by:

generating additional synthetic data based on the generator;

supplying the additional synthetic data to the pre-trained model;

collecting statistics of activations of the pre-trained model; and quantizing the pre-trained model based on the statistics of activations of the pre-trained model.

14. The system of claim 8, wherein the memory further stores instructions for performing model compression on a second pre-trained model, the pre-trained model and the second pre-trained model being trained using a same set of training data, by:

generating additional synthetic data based on the generator;

supplying the additional synthetic data to the second pre-trained model;

collecting statistics of activations of the second pre-trained model; and quantizing the second pre-trained model based on the statistics of activations of the second pre-trained model.

* * * * *

UNITED STATES PATENT AND TRADEMARK OFFICE
CERTIFICATE OF CORRECTION

PATENT NO. : 12,154,030 B2  
APPLICATION NO. : 17/096734  
DATED : November 26, 2024  
INVENTOR(S) : Yoo Jin Choi et al.

Page 1 of 1

It is certified that error appears in the above-identified patent and that said Letters Patent is hereby corrected as shown below:

In the Claims

In Column 20, Line 42, in Claim 1, delete "$\hat{\sigma}_\psi{}^2,$" and insert -- $\hat{\sigma}_\psi{}^2;$ --.

In Column 22, Line 57, in Claim 8, after "$\hat{\mu}_\psi,$" insert -- , --.

Signed and Sealed this  
Eleventh Day of March, 2025

Coke Morgan Stewart  
*Acting Director of the United States Patent and Trademark Office*